Figure 1:
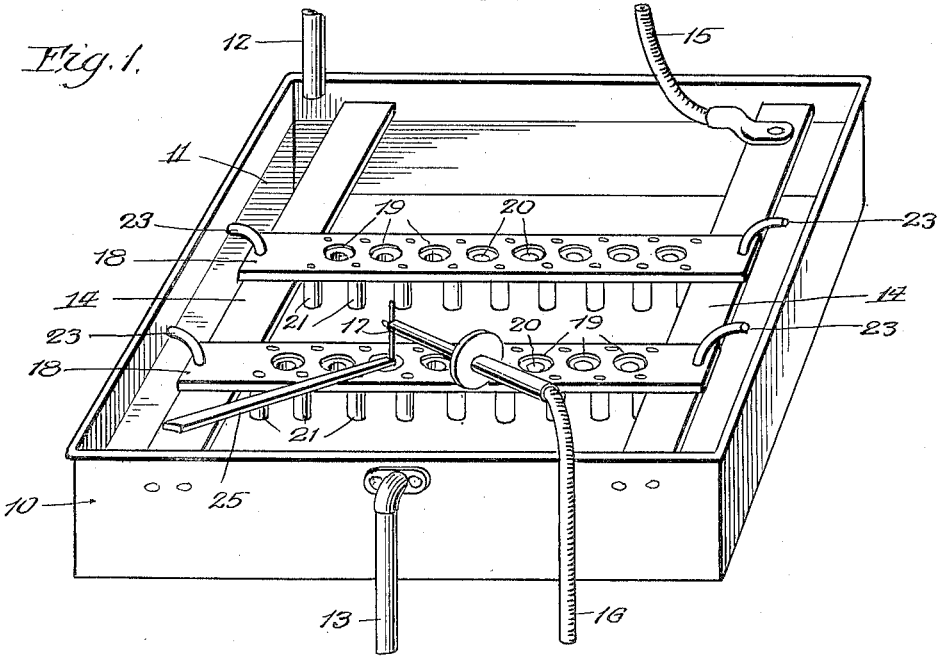

Dec. 6, 1927.  1,651,547

G. R. RICH

APPARATUS FOR AND METHOD OF MAKING COMPOSITE METAL ARTICLES BY ARC WELDING

Filed May 6, 1927

Inventor;
George R. Rich,
by Charles J. Hervey
his Atty.

Patented Dec. 6, 1927.

1,651,547

UNITED STATES PATENT OFFICE.

GEORGE R. RICH, OF BATTLE CREEK, MICHIGAN.

APPARATUS FOR AND METHOD OF MAKING COMPOSITE METAL ARTICLES BY ARC WELDING.

Application filed May 6, 1927. Serial No. 189,191.

This invention relates to apparatus for and method of making composite metal articles and its principal object is to provide novel means and a method for welding cast iron to steel bodies and chilling the cast iron while in solution, whereby a greater chill hardness may be obtained than heretofore. Another object is to provide a method of welding cast iron (from a bar of cast iron) to steel bodies, which may be practiced economically, whereby a high grade composite steel and iron article may be produced at a low cost.

The invention has particular reference to valve tappets formed of steel bodies and having cast iron crowns or heads, and an object of this invention is to provide means and a method whereby such articles may be made economically, and which shall have a crown or head formed of cast iron or white iron welded to the steel tappet body and having great hardness.

With these and other objects and advantages in view, this invention consists in an apparatus for holding the tappets during the welding process, and in which they are suddenly chilled while the cast iron crown or head is in solution. It further consists in the method of welding cast iron crowns or heads upon steel bodies, which includes the step of suddenly chilling the cast iron while in a molten state or in solution. It further consists in the several novel features hereinafter fully set forth and claimed.

Figure 2:
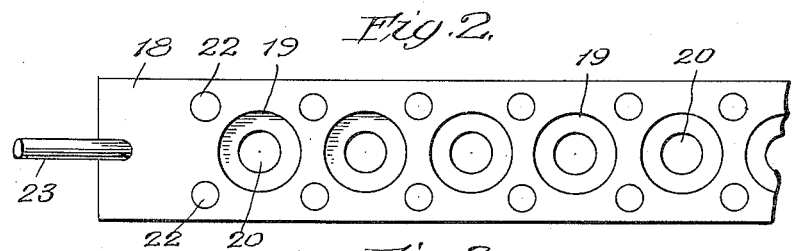
Figure 3:
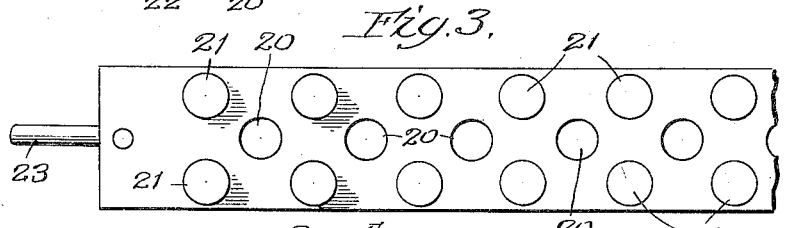
Figure 4:
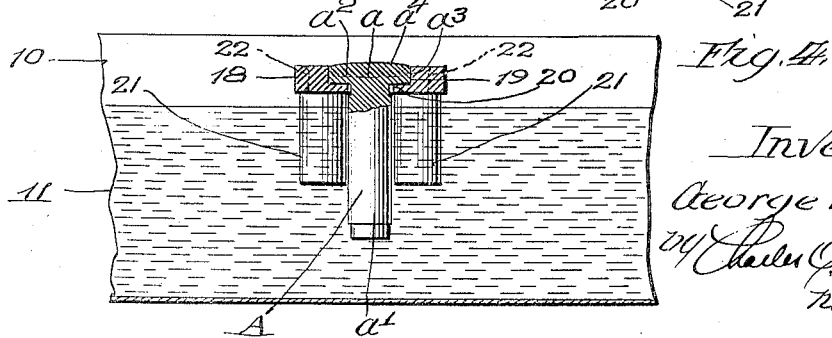

The invention is clearly illustrated in the drawing accompanying this specification, in which:

Fig. 1 is a perspective view of an apparatus employed in carrying out the process; Fig. 2 is a plan of a fragment of a metal bar for holding the articles in place during the welding and chilling process; Fig. 3 is a view of said bar, looking from below, and Fig. 4 is a cross section through a fragment of the apparatus seen in Fig. 1.

Referring to said drawing, which illustrates an apparatus embodying a simple form of the invention as employed in carrying on the herein described process, the reference character 10 designates a vessel or container, such as a pan, for containing water or other cooling liquid 11. A liquid supply pipe 12 delivers water or other cooling liquid into the vessel, and an overflow pipe 13 discharges the liquid from the vessel at a certain level. When carrying on the process, cold water or other cooling liquid is constantly supplied to the vessel and the overflow discharges through the overflow pipe 13.

Supported in the vessel are two rails or other supports 14, preferably in the form of metal bars which may be placed near two opposite ends of the vessel, and in case an arc welding process is used for welding the cast iron crowns or heads to the steel bodies, one of said bars 14 is connected to one electric conductor 15 of an electric circuit, which includes a generator, dynamo or the like, for supplying electricity of the proper voltage and amperage to produce a welding arc. The other conductor 16 of the circuit is connected to the arc welding tool 17. Other suitable heat supplying means may be substituted for the arc welding apparatus, provided such intense heat is supplied, as will fuse the cast iron.

Resting on the bars 14, but as a preference removably supported thereon, are supports for the articles to be acted on, preferably in the form of bars 18, that make electrical contact with the bar 14, which is in the electric circuit, and said bars 18 are formed with countersinks 19, and are apertured as at 20 to receive the enlarged ends of the articles and support them during the welding process. In the form of the invention illustrated, the countersinks are shaped to conform, generally to the shape of the head portion $a$, of valve tappets, A and the apertures 20 are large enough to receive the stems $a^1$ of the tappets. For obtaining the best results the end faces $a^2$ of the tappet head portions $a$, are recessed to leave marginal ribs $a^3$. The recesses 19 are deep enough to contain the head portions $a$, and the cast iron crowns $a^4$ when welded thereto.

The bars 18 are supported in a position slightly above the level of the water or other cooling liquid contained in the vessel. Upon the lower side of the bars 18 are heat conducting lugs, ribs, fins or the like 21 which project into the water or other cooling liquid. For convenience lugs are illustrated, which are secured to the bars in any suitable manner as for instance by neck portions 22 that extend through holes in the bars and are headed down thereon. This exact arrangement is immaterial to the invention, but serves for the purpose of illustration. Handles 23 are secured to the ends of the bars 18 whereby they may be handled readily.

The bars 18 are formed of copper or other metal or alloy which has the characteristics of conducting heat rapidly, because in order to carry on the present method effectively, the heat developed in welding the cast iron crown to the head portion of the article must be conducted away very rapidly in order that the cast iron crown may be chilled while the metal is in solution. The projections 21 of the bars 18 being immersed in the water, the heat is readily absorbed by the water and carried away from the article.

In practicing the method of welding cast iron crowns to steel bodies, such as valve tappet bodies, cold water or other cooling liquid is passed through the vessel, and a number of the tappet bodies placed in the bar or bars 18. The bars 18 being placed on their supports in the vessel, the workman holds one end of a stick 25 of cast iron in the countersink for one valve tappet and applies heat to the cast iron stick and tappet head until and for a short period after sufficient cast iron has been melted from the stick to fill the countersink above the tappet head. When the arc welding process is used the workman applies the graphite or carbon stick of the arc welding tool to the end of the cast iron stick and melts away enough of the cast iron to fill the countersink above the steel tappet head, and stirs the molten metal around in the countersink for a moment or two, and proceeds to do the same with all of the tappet bodies held by the bars 18. During this process the melted cast iron is fused to the steel head portion of each tappet body and is integrally united therewith.

The bar 18 quickly absorbs the heat conducted to it by the hot tappets, and instantly conducts the heat, through the lugs 21 and into the water, which instantly absorbs the heat conducted to it, and conveys the heat away as it overflows and discharges, through the overflow pipe. The cast iron crowns are therefore chilled very suddenly when the welding tool is removed from a tappet, and therefore a higher degree of chill hardness is obtained for the crown of the tappet than has been obtained heretofore. The tappets are allowed to remain in the bars for a moment or two and then discharged from the bars. In actual experience it is found that the tappets are cooled very quickly and can be handled by hand directly after being discharged from the bars. They are found to possess a hardness of 8 to 10 points (Rockwell) more than tappets heretofore formed. Furthermore it is found that the bars for holding the tappets last longer than usual.

The molten metal does not appreciably wear away the metal of the bars, but they may be used indefinitely by simply cleaning out the countersinks thereof. This I believe is due to the continuous cooling effect of the moving body of water in which the cooling lugs or fins of the bars are immersed.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. An apparatus for use in welding cast iron crowns to steel articles, comprising a vessel, means for flowing a cooling liquid therethrough, and a high heat conducting bar for supporting the articles, and having heat conducting projections thereon immersed in said cooling liquid.

2. An apparatus for use in welding cast iron crowns to steel articles, comprising a vessel, means for flowing a cooling liquid therethrough, and a high heat conducting bar supported in said vessel, and arranged to support the articles, said bar having heat conducting lugs thereon, immersed in said cooling liquid.

3. An apparatus for use in welding cast iron crowns to steel valve tappet bodies, comprising a vessel for containing water, a cold water pipe emptying thereinto, and an overflow pipe leading therefrom, and an apertured heat conducting bar removably supported in said vessel and having countersinks above the apertures for receiving the parts of the tappet bodies to which the crowns are welded, said bars having also heat conducting members immersed in the water contained in the vessel.

4. An apparatus for use in welding cast iron crowns to steel valve tappet bodies, comprising a vessel for containing water, a cold water pipe emptying thereinto, and an overflow pipe leading therefrom, and an apertured copper heat conducting bar removably supported in said vessel and having countersinks above the apertures for receiving the parts of the tappet bodies to which the crowns are welded, said bars having also copper lugs immersed in the water contained in the vessel.

5. The method of welding cast iron crowns to steel articles, which consists in suspending the steel articles from a heat conducting member with parts of said articles and heat conducting member immersed in a body of flowing water, and fusing cast iron to the upper exposed face of said steel articles.

6. The method of welding cast iron crowns to steel articles, which consists in suspending the steel articles from a heat conducting bar, formed with head conducting lugs, fusing cast iron to the exposed upper faces of said steel articles and flowing a moving body of water across the surfaces of the depending parts of said articles and heat conducting lugs.

7. The method of welding cast iron crowns to steel valve tappet bodes, which consists in suspending the steel tappet bodies from a heat conducting bar formed with heat conducting lugs, fusing cast iron to the upper exposed faces of the steel tappet bodies and rapidly conducting away the heat from said welded tappets with a moving body of water in which the depending parts of the tappets and heat conducting lugs are immersed.

8. The method of welding cast iron crowns to a steel articles, which consists in suspending the steel articles from a heat conducting bar formed with heat conducting lugs, electrically fusing cast iron to the exposed upper faces of said steel articles and rapidly conducting away the heat from said welded articles with a moving body of water in which the depending parts of said articles and heat conducting lugs are immersed.

GEORGE R. RICH.